July 26, 1966     H. C. EMERICK     3,263,005
PROCESS FOR PRODUCING CONTACT LENSES AND OTHER OPTICAL AIDS
Filed April 17, 1963
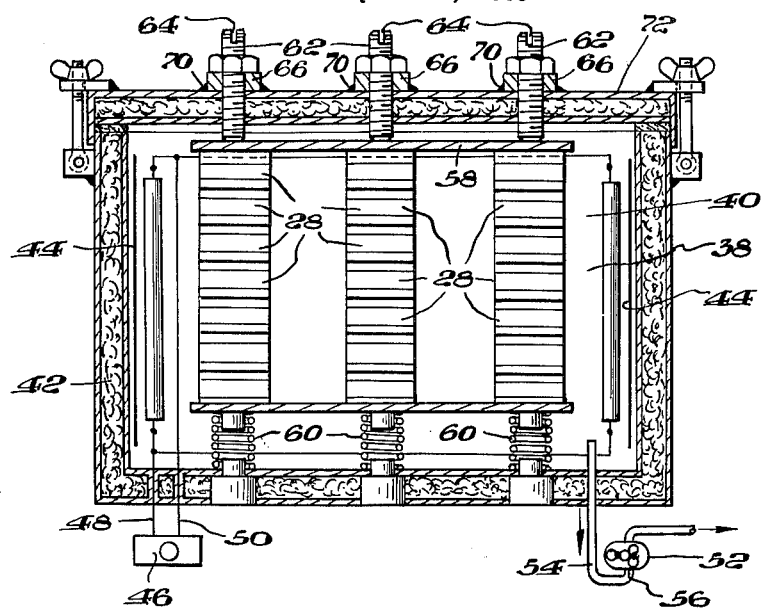
Fig. 4.
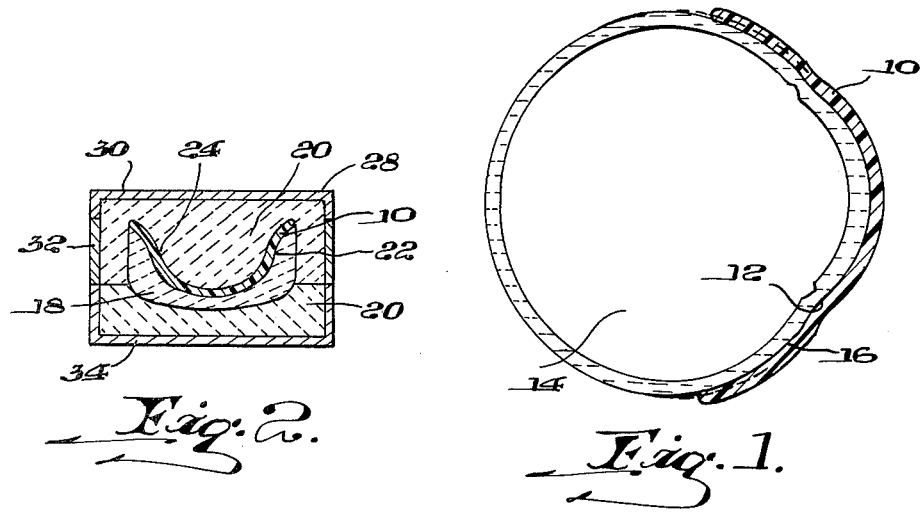
Fig. 2.
Fig. 1.
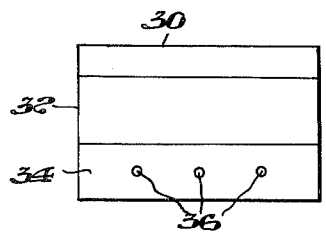
Fig. 3.
INVENTOR.
HAROLD C. EMERICK.
BY
Albert L. Jeffers
his
ATTORNEY United States Patent Office 3,263,005
Patented July 26, 1966

3,263,005
PROCESS FOR PRODUCING CONTACT LENSES AND OTHER OPTICAL AIDS
Harold C. Emerick, 5007 Wayne Trace, Fort Wayne, Ind.
Filed Apr. 17, 1963, Ser. No. 273,589
11 Claims. (Cl. 264—1)

This invention relates to a process for producing contact lenses and other optical aids and more specifically to a process of producing molded lenses from plastic heat-hardenable resin materials.

There are many physiological, as well as cosmetic reasons for using optical aids in the form of contact lenses. Where the usage of contact lenses is indicated there are numerous methods of fitting the prospective user, for example, by molding lens-forming material to the shape of the orb while at the same time maintaining a suitable lens configuration which is attained either by molding to final dimension or by grinding to final dimension following fitting. The process, known in the art as the "Dallos" method, comprises taking a number of impressions to form a mold which will replicate the anterior scleral portion. Copying of the mold is effected by successive stages in wax then plaster of Paris, an investment and finally a resin material. The initially obtained shell is next ground to be congruent with the scleral and the opposite surface of the lens is finely ground to provide the desired lens effect.

The present invention, utilizes plastic material as the material of construction because of its lighter weight as compared to glass of the same focal power and size, being approximately ⅓ the weight of the glass. The reduced weight makes it more comfortable to the user and the user is generally less conscious of the presence of the lens.

When processed in accordance with the present invention, the plastic lens as compared with plastic lenses made by other processes, is clearer, is more resilient and therefore tends to conform more readily with the scleral section and also tends to be less fragile.

Many users report that the plastic is more resistant to tears; and, the plastic can be treated so that moisture which is wiped over the surface of the plastic will form a continuous lamination rather than separating into tiny droplets and in some instances forming a light mist.

Unfortunately, in the process of curing the resin, not all of the volatiles content of the plastic is removed, and in time, such material will "bleed out" and produce irritation to the sensitive portions of the eye and thereby produce a hypersensitive condition and causing discomfort to the user.

Moreover, in the process of molding, it has been found that if the lens includes any unpolymerized plastic material, this will cause dimensional instabilities, and the lens will distort, warping or changing in some other manner from its prescribed configuration. Such unpolymerized resin materials will also cause the lens to be susceptible to internal stresses so that if the lenses should be dropped or encounter any impact it is likely to be damaged by fracturing.

Another disadvantage of incompletely polymerizing the plastic material is that it tends to be less transparent, and any degree of opacity will seriously detract from clarity of vision for the user.

Accordingly, it is one of the objects of the present invention to employ a new and improved molding method for producing plastic lens and optical aids wherein the plastic material is more completely polymerized by the use of high temperatures, heretofore regarded as unattainable without damaging the plastic or in any way adversely affecting the plastic lens.

Another object of the present invention is to provide an improved process for producing a plastic lens article wherein substantially all of the volatilized ingredients are removed while completely polymerizing the resin material to obtain thereby improved dimensional stability and a lens having greater transparency than was previously obtained.

An overall object of the present invention is to provide a contact lens or other optical aid which is constructed from plastic material, by a simple and inexpensive method wherein the resin product is completely polymerized and all of the volatilizable ingredients are withdrawn from the finished product.

Additional objects and features of the invention will become apparent from a consideration of the following description, which proceeds with reference to the accompanying drawings, wherein:

FIGURE 1 is a cross-sectional view illustrating a molded contact lens in place upon an individual's eye;

FIGURE 2 is a sectional view taken through a flask having a plastic lens therein which is ready for polymerization;

FIGURE 3 is a front elevation view of a flask illustrating the apertures therein; and, FIGURE 4 is a schematic sectional view of the apparatus for controllably heating the flask and its contents to a suitable temperature wherein the plastic material is completely polymerized under subatmospheric pressure to produce a product of superior properties.

Referring now to the drawings, there is illustrated a contact type lens 10 which is of molded resin construction and is referred to as a corneal type contact lens. The present invention can, however, be used to produce scleral lenses as well. The particular optical effect of the lens 10, its size and configuration are not critical to the invention.

In the lens illustrated, the lens is fitted to the anterior side 12 of the eye ball 14 and can provide its optical correction either by the configuration of the lens or by a liquid lens wherein a saline solution film 16 or other suitable solution is provided between the posterior side of the eye ball and the contiguous face of the lens 10. In most applications, there is a capillary space between the lens 10 and the eye ball 14 and the particular size of the space is to obtain a desired lens effect. Normally, in the case of a corneal type lens, the lens is held in conformity and shape by capillary attraction. For a complete discussion of the principles involved, reference is made to "Principles of the Contact Lens" by H. Treissman and E. A. Plaice, London, Henry Kipton (1946).

In the molded type construction lens, an impression is made of the individual's eye ball by some suitable method, as for example, the so-called "Dallos" method and from numerous impressions, there is constructed a model 18 which is located within an investment 20 which may consist of gypsum, dental stone, plaster of Paris or the like. A paste or dough mix comprised of a combination of monomeric and polymeric plastic materials is molded into the form of the lens in accordance with the dimensions of the die cavity 22 defined by the model 18 and investment 20. The general requirement of the paste or dough 24 is that while being of stiff consistency, it is still permitted to adapt itself in the mold. The resin material can be comprised of any suitable resin constituents, providing the finished product is transparent and possesses a suitable degree of strength and moldability. Materials which have been used with success but to which I do not imply are limited, include methyl methacrylate and polystyrene. The present invention is not limited to a specific molding material but may include numerous resin compositions. The lens, may also be constructed from suitable combinations of methyl methacrylate and other resins, as for example, acrylic resin, and such combinations are commonly sold under the trademark "Lucitone," "Densene" and "Verno-Nite," etc.

It was generally thought, that if plastic materials of this type were heated to a substantial processing temperature, in the range of 240° F. to 280° F., that the materials would develop undue porosity and would tend to become pyrolytically decomposed. On the contrary, it has been found that lenses constructed at these higher temperatures will have improved strength properties, the finished lens product will be harder, or greater resistance to indentation and scratching or other marring at the surface which would require expensive repolishing and restorative work, has less fatigue, improved proportional limit, and has greater impact resistance.

The investment 20 is confined within a split flask 28 having sections 30, 32 and 34 and is then closed. Flask 28 is provided a number of apertures 36 for a significant purpose, which will be explained hereafter. An electric vacuum oven or heated chamber 38 comprises an enclosure having a space 40 filled with insulation 42 and is provided with a gold plated reflector plate 44 which surrounds the chamber. A number of heat lights or lamps preferably six lamps of 500 watts each are disposed along the sides of the chamber and are controlled by a power stat 46, connected to the bulbs by lines 48 and 50. The vacuum pump 52 is connected to the inside of the chamber through line 54 and includes a screen 56 disposed on the inlet.

Pressure means, in the form of a clamp 58 loaded by springs 60 is urged against the flasks 30 (a number of vertical rows being included), by means of a screw 62 which has a slotted head 64 fitted through a threaded spring 66 and is turned down to urge the flasks against springs 60. Nut 68 having the threaded opening is welded at 70 to top plate 72. The flasks are therefore held closed and the investments are held within the mold cavities by the pressure effected from said screw and spring.

The charged flask or a number of charged flasks 28 are next placed within the enclosed heating chamber 38 and heat is gradually applied for a period of about one hour until the temperature of the flasks and contents reaches about 160° F. to 200° F. During this stage of the process, partial resin polymerization occurs and air bubbles are removed from the resin charge.

The plastic dough may include monomer or may be completely polymeric powder which is heated and polymerized within the mold cavity.

A slight pressure is developed on the flask by manual operation during this period of softening the resin in order to safeguard against porosity. It is during this period that the resin obtains its maximum plasticity.

At the end of the described heating period, the enclosure 38 is exhausted to establish a vacuum of approximately 28 inches of mercury by the pump 52. The temperature of the oven is now increased to heat the flask and contents to approximately 550° F. The resin is heated at this temperature for a period of about one-half hour to one and one-half hours depending upon the size of the oven, the number of flasks, etc. The important consideration is that the resin is thoroughly heat permeated at this temperature and allowed to bake until complete polymerization is effected and all volatile fractions are removed. During this stage the flasks are under pressure and bear against the contents to insure confinement of the resin charge.

The apertures 36, disposed in the lower portion of the flask, permit a vacuum to be created within the flask so that the resin is pulled downwardly into seating relation with the mold and therefore the resin will have a tendency to take on a more precise replication of the mold or model, and consequently the finished product becomes a more perfect fit in its scleral or corneal location. Also, the apertures expedite the removal of gases, air and moisture within the flask.

The described heat treatment precludes stratification within the resin whether it originated as a dough comprised of monomer and polymer or as a powder comprised entirely of polymer. The resin is homogeneous and this is attributed in some degree to the high curing temperature. It will be appreciated that the magnitude of temperature employed in the described process is well beyond any recommended curing temperatures previously followed in the construction of plastic lens materials. All available literature from other investigators clearly contraindicates the usage of such temperatures during heat processing to cure the resin, particularly where the finished product must have a substantially complete transparency as is the case with the lens construction.

With complete removal of air and gases from the plastic and investment, there is an almost completely true replication of the mold thereby reducing the number of fittings which are required following the impressions which are taken of the eye ball and from which the model 18 is constructed.

To insure even better results I have subjected the investment material to vacuum driven mixing but prior to locating it within the mold, and in this way no air bubbles can be released to mar the surface of the lens.

Since the internal stresses are removed from the finished product by means of the described process, there is greater structural stability and therefore lens warpage. The higher processing temperatures also lead to improved reproduction quality of the lens.

The absence of internal strains is believed to account for improved conformance of the resin with the outline of the mold cavity, thus making possible a greater adaptation of the resin to the mold outline.

Owing to the non-warping nature of the lens, the optical aid retains its original shape and thus contributes to comfort and accurate positioning in its location on the eye, and, because of its light weight, it is retained by the capillary action of the fluid between the anterior surface of the eye and contiguous surface of the lens.

There is a tendency, with the resins described, to develop a milky color owing to the presence of certain chemicals which are included to harden the plastic. In the present invention, however, these constituents are removed by the vacuum pump 52 through line 54 and the milky color is eliminated whereby the resulting plastic article is clear and is substantially completely transparent and remains so indefinitely.

It is not intended, by specific reference to the 550° F. temperature that this temperature is the only attainable temperature. Other temperatures are established according to the resin composition. The temperature is established by the general rule that sufficient heat is is developed to attain a complete polymerization, removal of all volatile fraction nad homogeneity of the resin charge.

It is important to retain a sufficient vacuum in the chamber during the second stage heating to avoid pyrolytic deterioration of the resin. If the vacuum diminishes, then there is likelihood of scorching, discoloring; or deteriorating the resin. These considerations are highly important in lens manufacture because not only can there result a discoloration and modeling variance, etc., but also these untoward results can produce a less stable finished product.

During the second stage of heating, all uncombined water of the investment is removed, as well as substantially all the air and gases from the resin. This permits the flask and flask contents to be heated well above the conventional 212° F. curing temperature.

In the previous processes which have been followed, there is generally a hot water bath for making the lens appliance, and a temperature of about 212° F. was the upper limit and was seldom, if ever, exceeded. For these reasons, there often remained unpolymerized monomeric fractions within the resin. It is believed that the imby reason of the substantially complete removal of such non-reactive chemicals as well as a more complete polymerization which can occur at higher temperatures and these portions may account for my improved results.

The described process is also useful in heating lenses made by other processes and which are corrected by means of investing and curing such lenses in the manner described.

The high temperatures may also have a further effect of relaxing internal stresses which are normally established incidentally to the formation of polymerized acrylic base resin products.

After about one hour, the temperature of 550° F. is gradually reduced, but the vacuum in the oven is maintained to safeguard against pyrolysis of the resin. The cooling rate is reduced sufficiently to allow for thermal contraction so as to avoid damage to the flask and contents.

When the charge is cooled, the lens is easily removed by crumbling the investment away which has become friable during the heat processing. This is done without impacting the investment which was necessarily incident to remove the finished product under previous methods. Previously, this removal of the lens was oftentimes accompanied by damage to the lens.

Owing to the harder nature of the lens, it has been found that scratching or marring of the surface of the lens is greatly reduced and therefore such blemishes which occur from time to time in other plastic lenses is to a large extent obviated.

Because of the complete removal of the volatiles, it is found that there is avoided a substantial source of irritation to the eye and therefore the adaptability rate of the user is increased. It is also possible to increase the comfort of the wearer of the lens both because the lens more readily adapts itself to the contour of the eye and also because it will not tend to "bleed out" contaminates which are a source of irritation to the eyeball.

It is further possible to increase the accuracy of making the lens and this reduces the number of fittings which are required by which the curvature of the front surface of the cornea as defined by a keratometer, is matched with the contiguous surface of the lens. It is also found that the lens tends to be more smooth along the posterior and anterior surfaces and the anterior surface of the lens tends to be more evenly coated with liquid to reduce clouding, blurring and the smooth anterior surface resists droplet separation.

Should the lens be in any way damaged it can be easily and quickly reground and because of the relief of the interior stresses and strains, it is less likely to produce damage to the lens.

Although the present invention has been illustrated and described in connection with a single example embodiment, it will be understood that this is illustrative of the invention and is by no means restrictive thereof. It is intended that revisions and variations of the invention which incorporate the herein disclosed principles, will be included within the scope of the following claims as equivalents of the invention.

I claim:

1. The process for making a completely cured heat hardened lens of resin composition which is rendered substantially entirely free of unpolymerized resin material of nonreacted vaporizable materials, said polymerized material being adapted for contact lens usage, comprising the steps of: mixing together polymeric and monomeric resin material, investing such material within a gypsum type plaster mold investment having a model which conforms with the desired lens contour, and while said resin is in pliable form to adapt to said model, shaping said plastic material to the mold investment structure and retaining the resin in a desired lens shape while providing egress of moisture monomer and other volatile ingredients from said resin through the surrounding walls of said gypsum mold, imposing said resin filled mold having the model and resin content therein under a pressure within the flask which yieldably confines said resin within its mold cavity, preliminarily heating said plaster model mold to effect removal of the vaporizable gaseous content thereof and concurrently effecting partial resin polymerization, continuously exhausting the atmosphere completely surrounding the entirety of said charged flask to suppress deterioration of both the plastic mold investment and its resin content while providing for substantially entire removal of vaporizable unreactive and nonreacted materials derived from said plaster and resin plastic material and which permeates through said plaster mold, and thereafter heating both the plaster mold and its resin content substantially above 212° F. to remove all volatilizable material from said resin and which is adapted to permeate through said pervious plaster model mold to effect substantially complete resin polymerization.

2. The process of claim 1 in which said preliminary heating is at a temperature range and time period below that necessary for effecting complete polymerization of said resin to obtain removal of air bubbles and initiate partial resin polymerization.

3. The process of claim 2 in which the flask contents consist of gypsum mold material and acrylic resin and are heated at a temperature range of between about 160° F. to 200° F. for a period of about one hour.

4. The process of claim 1 in which the flask and flask contents are subjected to a constant pumping action to effect an ambient vacuum by continuously withdrawing materials emerging from said plaster mold investment and resin and through apertures of said flask to maintain a vacuum in the order of 28 inches of mercury.

5. The process of claim 4 in which the flask is heated for a period of ½ to 1½ hours depending upon the number of flasks concurrently processed to effect substantially complete polymerization of said resin.

6. A process for producing a contact lens of a corneal or scleral construction wherein said lens includes a light-modifying anterior surface which alters the optical system of the eye, said process comprising the steps of: completely filling an investment mold with a resin charge which is compressed and pliable to conform with the outline and shape of said mold and includes a combination of polymeric and monomeric polymerizable materials, retaining said resin charge within the investment mold cavity by surrounding said resin with a porous wall structure, said investment wall structure being pervious to the flow of gaseous materials liberated from said resin during the heating thereof to allow escape of such gaseous materials volatilized within said resin while it is retained under pressure within said mold, producing a constant vacuum completely surrounding said investment to withdraw both moisture and other volatilizable material from within said resin and surrounding porous investment to safeguard said investment and resin against deterioration from heat, partially polymerizing the resin content within said investment mold by heating to a temperature below 212° F. and thereafter increasing the heating of said resin and its surrounding investment to a temperature substantially above 212° F. but not substantially more than about 550° F. to completely polymerize the resin and remove substantially all the uncombined volatilizable materials therein and without deteriorating said resin and investment.

7. The process of claim 6 in which the resin comprises a cake sufficiently pliable to be conformable with the mold cavity and inclusive of powdered methyl methacrylate and liquid monomer.

8. A process for making heat hardenable corneal construction lenses of the contact type, consisting of heat hardenable resin and the like, said process comprising the steps of: forming a plaster model for defining a cavity which receives said resin and conforms said resin to a predetermined shape wherein said resin in configured along one side to follow the curvature of the individual eye and at the opposite side to provide a preferred lens effect, said lens being in a pliable condition at the time of investing within said plaster model and including a combination of polymeric and liquid monomer material, completely filling said mold with such polymerizable resin which is pressurized and is pliable to conform with said cavity, maintaining a positive pressure on said resin while it is confined within said cavity and is surrounded by said mold cavity having vapor-phase conductive walls, thereafter subjecting said resin charge and its surrounding investment to a continuous vacuum while said resin and mold cavity are heated, and elevating said resin to a temperature substantially in excess of its polymerization temperature to effect thereby substantially complete removal of all volatile fractions in the resin charge by passage thereof through said investment, said vacuum being effective to suppress destructive pyrolytic effects on both said resin and investment incidentally to heating at said elevated temperature.

9. The process in accordance with claim 8 wherein said polymerization is produced and wherein said mold and contents are under exterior compression.

10. A process for making lens constructions for contact lens usage comprising the steps of: investing within a stone investment mold of the gypsum type having moisture therein, a combination of polymeric and monomeric resin plastic material which completely fills the investment mold and is pliable to conform with the shape of said mold, disposing said mold and its contents within an enclosed chamber, producing a subatmospheric pressure within said chamber which exposes the entirety of said mold to such subatmospheric pressure to remove constantly the gaseous impurities within said plastic material conducive to impairment thereof and which polymerizes said plastic material at an elevated temperature above the volatilization temperature of monomeric fraction of said plastic material at the subatmospheric pressure within said chamber, said gypsum mold being also subjected to subatmospheric pressure to suppress calcination as an incident to said polymerization at such elevated temperature.

11. A process for making contact lenses comprising the steps of: entirely filling a stone investment mold of the gypsum type having moisture therein with a polymerizable mixture of polymeric and monomeric resin plastic material, subjecting the entirety of said investment mold and its resin plastic contents to a subatmospheric pressure within an enclosed chamber to constantly remove gaseous impurities within said plastic material which are conducive to impairment thereof, and polymerizing said resin plastic material at an elevated temperature which is at least above the volatilization temperature of the monomeric fraction of said plastic material under subatmospheric conditions within said chamber, said stone investment being also exposed to subatmospheric pressure to suppress calcination thereof incidentally to the high temperature which effects polymerization of said resin plastic contents.

References Cited by the Examiner

UNITED STATES PATENTS

| | | | |
|---|---|---|---|
| 1,336,180 | 4/1920 | Allen et al. | 264—87 |
| 1,717,996 | 6/1929 | Moore | 264—87 X |
| 1,862,336 | 6/1932 | Dresch | 264—86 |
| 2,111,622 | 3/1938 | Goepp | 264—87 |
| 2,542,386 | 2/1951 | Beattie | 264—1 |
| 2,644,985 | 7/1953 | Crandon | 264—1 |

ALEXANDER H. BRODMERKEL, *Primary Examiner.*

J. R. DUNCAN, B. SNYDER, *Assistant Examiners.*

UNITED STATES PATENT OFFICE
CERTIFICATE OF CORRECTION

Patent No. 3,263,005          July 26, 1966

Harold C. Emerick

It is hereby certified that error appears in the above numbered patent requiring correction and that the said Letters Patent should read as corrected below.

Column 3, line 11, for "or" read -- of --; column 4, line 54, for "nad" read -- and --; column 5, line 1, before "by" insert -- proved results of this present invention are brought about --.

Signed and sealed this 1st day of August 1967.

(SEAL)

Attest:

EDWARD M. FLETCHER, JR.
Attesting Officer

EDWARD J. BRENNER
Commissioner of Patents